(12) United States Patent
Miller et al.

(10) Patent No.: US 7,818,338 B2
(45) Date of Patent: Oct. 19, 2010

(54) PROBLEM DETERMINATION SERVICE

(75) Inventors: Brent Alan Miller, Cary, NC (US);
Denilson Nastacio, Apex, NC (US);
Marcelo Perazolo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 11/627,820

(22) Filed: Jan. 26, 2007

(65) Prior Publication Data

US 2008/0183704 A1 Jul. 31, 2008

(51) Int. Cl.
*G06F 7/00* (2006.01)
(52) U.S. Cl. .............. 707/770; 707/705; 707/758; 707/769; 706/45; 706/46; 706/48; 706/50; 702/182; 702/183; 702/184; 702/185
(58) Field of Classification Search ............ None
See application file for complete search history.

(56) References Cited

U.S. PATENT DOCUMENTS

| | | |
|---|---|---|
| 5,528,748 A | 6/1996 | Wallace |
| 5,864,662 A | 1/1999 | Brownmiller et al. |
| 6,463,441 B1 * | 10/2002 | Paradies ............... 707/102 |
| 6,643,801 B1 | 11/2003 | Jammu et al. |
| 7,275,017 B2 * | 9/2007 | Dini et al. ............ 702/182 |

\* cited by examiner

*Primary Examiner*—Hung Q Pham
(74) *Attorney, Agent, or Firm*—Stevens & Showalter, LLP (57) ABSTRACT

A service system receives a request for problem resolution knowledge from a service requestor. Upon receiving the request, the service system identifies candidate patterns where each candidate pattern has at least one element that characterizes a problem associated with the corresponding pattern. An iterative process is then repeated between the service requestor and the service system until a stopping criterion is met, which attempts to narrow the field of candidate patterns down until one or more possible root causes of the problem experienced by the service requestor are identified. Alternatively, it may be determined that a possible root cause of the problem is not contained in the candidate patterns or that some other action, event, etc., interrupts the iterative process.

24 Claims, 7 Drawing Sheets

PROBLEM DETERMINATION SERVICE

BACKGROUND OF THE INVENTION

The present invention relates to systems, computer program products and computer implemented methods for controlling the distribution of knowledge, such as problem resolution knowledge.

Conventional enterprise computing systems are becoming complex, often integrating numerous computer platforms, devices and technologies. However, this complexity renders such computer enterprises susceptible to a variety of problems in both hardware and software that can be time-consuming and often difficult to diagnose and correct. For example, in a typical diagnosis operation, a systems analyst may have to sort through an overwhelming amount of data available in the form of event log files, configuration files and other information, to identify clues as to the root cause of an existing problem. The problem diagnosis is thus heavily dependent upon the skill, knowledge and training of the systems analyst to correlate the available data and to identify causal relationships buried within this data. Moreover, relationships among critical information in the event data can be counter-intuitive and distributed across one or more information sources, which themselves may be unrelated. Still further, a combination of multiple events recorded in the information sources may reveal more complex problems in the enterprise computing system. However, it may be difficult for a systems analyst who is focused on a particular problem to recognize the symptoms of the more complex problem. Accordingly, troubleshooting becomes a hard and cumbersome task.

Moreover, it can be difficult and problematic to control the distribution of problem resolution knowledge. For example, many businesses do not comprise the expert knowledge required to efficiently troubleshoot problems. Rather, responses may be limited to problem management, such as by obtaining problem resolution knowledge from third party business partners. However, bandwidth and/or time concerns may make the exchange of necessary information between the business partners impractical. Additionally, the business partner possessing the problem resolution knowledge may want to avoid the disclosure of problem knowledge that is not relevant to the issue at hand. Even an enterprise that possesses suitable problem resolution knowledge may find it difficult to manage the distribution of such relevant knowledge to effect problem solutions due to bandwidth and time constrains imposed by the infrastructure of that enterprise.

BRIEF SUMMARY OF THE INVENTION

According to one aspect of the present invention, a method of controlling the distribution of resolution knowledge comprises receiving a request for resolution knowledge from a service requester, and identifying a plurality of patterns as candidate patterns, each candidate pattern having at least one element that characterize a corresponding problem. The method may further comprise repeating until at least one stopping criterion is met: providing information to the service requester that identifies a select element of each remaining candidate pattern, receiving information from the service requestor that enables identification of ones of the candidate patterns having its select element matched to corresponding information considered by the service requester, and removing each pattern as a candidate pattern if the problem associated with that pattern is resolved by the received information. The method may further comprise resolving the request after detecting that the at least one stopping criterion has been met.

According to another aspect of the present invention, a system to control the distribution of resolution knowledge comprises a module that receives a request for resolution knowledge from a service requestor and a module that identifies a plurality of patterns as candidate patterns, each candidate pattern having at least one element that characterize a corresponding problem. The system may further comprise a module that controls an iterative process until at least one stopping criterion is met comprising: a module that provides information to the service requester that identifies a select element of each remaining candidate pattern, a module that receives information from the service requester that enables identification of ones of the candidate patterns having its select element matched to corresponding information considered by the service requester, and a module that removes each pattern as a candidate pattern if the problem associated with that pattern is resolved by the received information. The system may further comprise a module to resolve the request after detecting that the at least one stopping criterion has been met.

According to yet another aspect of the present invention, a computer program product to control the distribution of resolution knowledge between entities comprises a computer usable medium having computer usable program code embodied therewith. The computer usable program code comprises computer usable program code configured to receive a request from a service requester for resolution knowledge and computer usable program code configured to identify a plurality of patterns as candidate patterns, each candidate pattern having at least one element that characterizes a corresponding problem. The computer program product may further comprise computer usable program code configured to control an iterative process until at least one stopping criterion is met comprising: computer usable program code configured to provide information to the service requester that identifies a select element of each remaining candidate pattern, computer usable program code configured to receive information from the service requester that enables identification of ones of the candidate patterns having its select element matched to corresponding information considered by the service requester, and computer usable program code configured to remove each pattern as a candidate pattern if the problem associated with that pattern is resolved by the received information. The computer program product may further comprise computer usable program code configured to resolve the request after detecting that the at least one stopping criterion has been met.

DETAILED DESCRIPTION OF THE INVENTION

The various aspects of the present invention may be embodied as a computer method, a system or computer program product. Also, various aspects of the present invention may take the form of an entirely hardware embodiment, an entirely software embodiment (including firmware, resident software, micro-code, etc.). Moreover, embodiments or aspects thereof, such as block(s) illustrated in the diagrams of the figures, may be generally referred to, either individually or collectively as a "circuit," "module" or "system." Furthermore, the various aspects of the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium.

More specific examples of the computer usable or computer readable medium comprise for example, an electrical connection having one or more wires, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or digital video disk (DVD), an optical fiber or storage device, or a transmission media such as those supporting the Internet or an intranet. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device or server. In the latter scenario, the remote processing device may be connected to the local processing device through a network such as a local area network (LAN) or a wide area network (WAN), or the connection may be made to an external processing device, for example, through the Internet using an Internet Service Provider.

Figure 1:
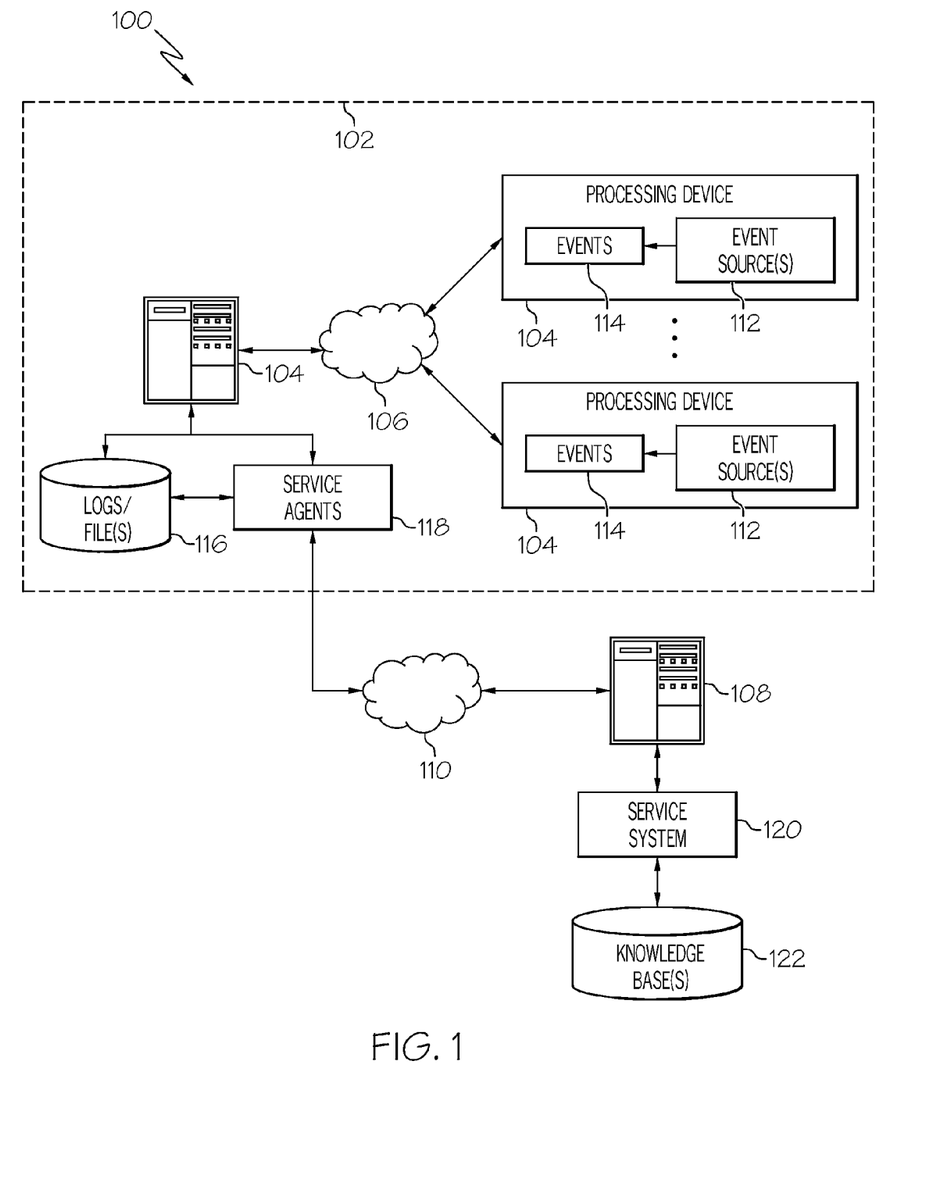
FIG. 1 is a block diagram of an exemplary system that may be used to implement a problem determination service.

Referring now to the drawings and particularly to FIG. 1, an exemplary system 100 comprises an enterprise computing system 102 having a plurality hardware and/or software processing devices 104 that are linked together by a first network 106. As shown, the enterprise 102 is communicably coupled to a processing device such as an analyzer server 108 across a second network 110, e.g., via a select one of the processing devices 104.

Typical processing devices include servers, personal computers, notebook computers, transactional systems, appliance or pervasive computing devices such as a personal data assistant (PDA), palm computers, cellular access processing devices, special purpose computing devices including gateways, load balancers etc., printing and imaging devices, facsimile devices, storage devices and/or other devices capable of communicating with other processing devices, either directly or across at least one of the first or second networks 106, 110. The processing devices may also comprise software, including services, processes, servers, applications that interact with various databases, spreadsheets, structured documents, unstructured documents and/or other types of files, etc.

The first and second networks 106, 110 provide communications links between the various processing devices of the system 100, and may be supported by networking components that interconnect the processing devices, including for example, routers, hubs, firewalls, gateways, network interfaces wired or wireless communications links and corresponding interconnections. Moreover, the networks 106, 110 may comprise connections using one or more intranets, extranets, local area networks (LAN), wide area networks (WAN), wireless networks (WIFI), the internet, including the world wide web, and/or other arrangements for enabling communication between the processing devices, in either real time or otherwise, e.g., via time shifting, batch processing, etc.

The system 100 is shown by way of illustration, and not by way of limitation, as a computing environment in which various aspects of the present invention may be practiced. For example, as shown, the analyzer server 108 is outside the enterprise computing system 102, which is identified by a dashed line, thus schematically representing an arrangement wherein the analyzer server 108 is maintained by a third party such as a business partner, or otherwise has at least some degree of influence or control outside the enterprise computing system 102. As an alternative arrangement, the analyzer server 108 may be part of the enterprise computing system 102 and thus maintained within the dashed line 102. Further, the first and second networks 106, 110 may represent exemplary different networks. For example, in the example where the analyzer server 108 is outside the enterprise computing system 102, the first network 106 may designate an enterprise LAN or WAN and the second network 110 may designate a connection to a network such as the World Wide Web portion of the Internet. The first and second networks 106, 110 may alternatively comprise part of the same network, e.g., an intranet, LAN, etc., such as may be implemented in an exemplary configuration where the analyzer server 108 is part of the enterprise computing system 102.

The enterprise computing system 102 includes event sources 112, which provide event information that may be used to assist in the management, supervision, monitoring maintenance, troubleshooting and/or other forms of administration of various aspects of the enterprise computing system 102. An exemplary event source 112 may comprise software, e.g., an application or event log, or hardware, such as an event logging device or adapter. The various event sources 112 will, from time to time, generate events 114 that are stored in one or more information sources, which are schematically represented by log files. The log files, along with configuration files and/or other forms of information are referred to as information 116 for convenience of discussion herein. The information 116 may also/alternatively comprise, for example, real-time event data as well as other "state data" (non-event data) that may be correlated or that otherwise communicates similar/related information as that that can be communicated by events.

An event 114 may be used to represent a change in the state of a hardware or software component or subcomponent, processes, feature, characteristic or other aspect of the enterprise computing system 102 that is associated with the corresponding event source 112. Events 114 may also be used to represent a change in the status of information or knowledge of the event source 112, or of devices, processes or other hardware and/or software associated with a corresponding event source 112. Such event information may, for example, impact the operation or processing of at least a subset of the enterprise computing system 102, or the event information may, in general, be of interest to someone or some process monitoring at least some aspect of the enterprise computing system 102.

As a few simplified yet illustrative examples, an event 114 could represent a storage device that has run out of available memory. An event may comprise a hardware device that has become disconnected, either logically or physically, from a corresponding network connection. An event 114 could also report the performance of a web-based business process via a systems management monitor that is monitoring amount of free CPU cycles available on a server, or an event 114 could represent knowledge of a change in the status of information such as information related to a branch or department within a business associated with the enterprise computing system 102, or change in information related to a customer, client, business partner, supplier or other source that interacts with, is relied upon, or is otherwise considered by a business associated with the enterprise computing system 102.

It is possible, and likely probable, that the number of events 114 that are generated by the various event sources 112 will exceed an amount of information reasonably manageable by a human operator without some level of assistance. In this regard, the computer enterprise system 102 further includes a service requestor, such as a service agent 118, which communicates with the analyzer server 108 across the second network 110 to obtain problem determination services. The analyzer server 108 comprises a service system 120 and a knowledge base 122. The service system 120 interacts with the service agent 118 to diagnose problems and provide domain knowledge and problem resolution to the enterprise computer system 102 based upon knowledge maintained in its corresponding knowledge base 122 as will be described in greater detail herein.

Figure 2:
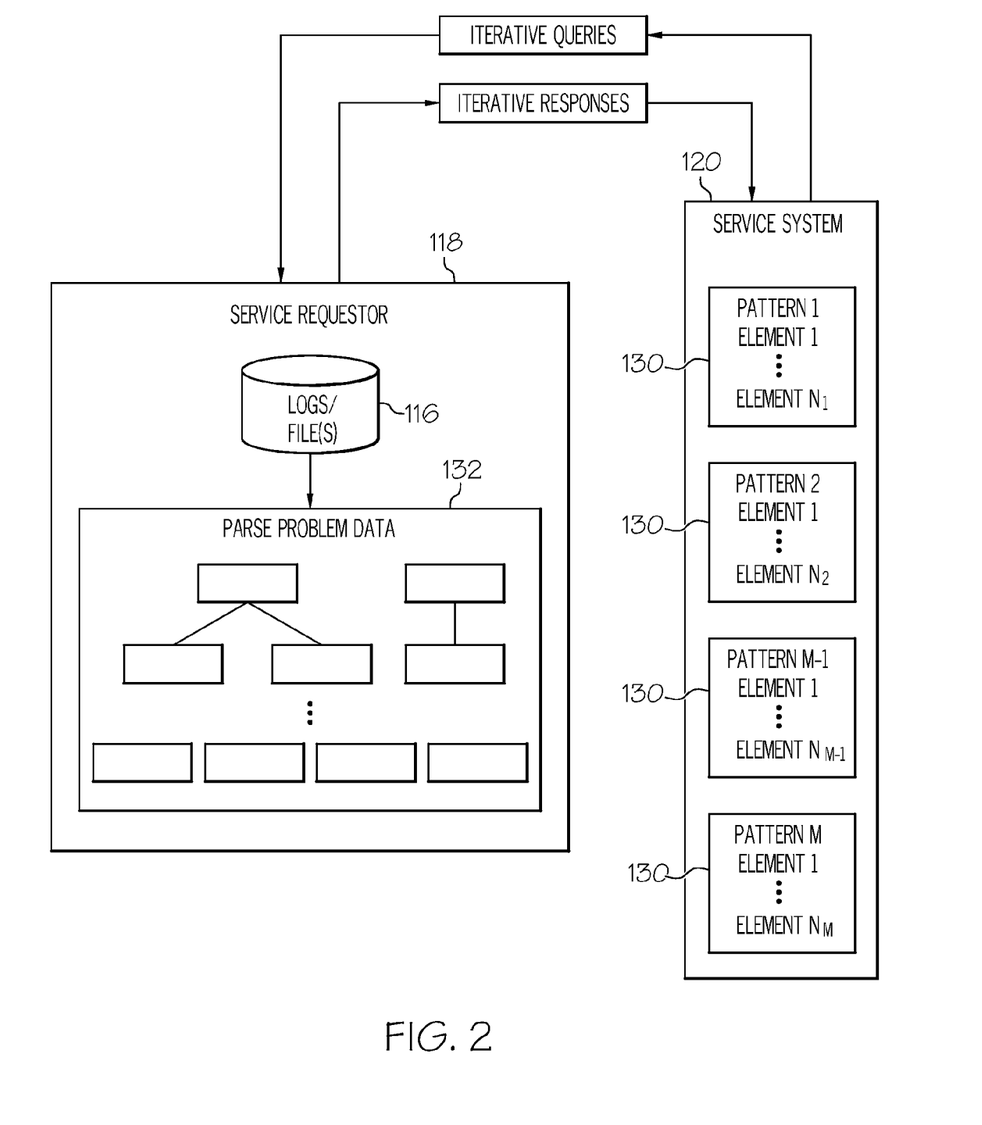
FIG. 2 is a block diagram illustrating exemplary interaction between a service requester and an analyzer server.

Referring to FIG. 2, an exemplary interaction is illustrated between the analyzer server 108 and the service agent 118 for problem determination support. The analyzer server 108 maintains a plurality of patterns 130 that are stored, for example, in the knowledge base 122. As shown, there are M patterns 130, where M is any integer. Each pattern 130 is defined by one or more elements that characterize a corresponding problem. Elements may include for example, one or more of a description of an event or events, a description of other information such as settings, parameters, configurations, etc., rules, conditions, sequences, steps and/or other criteria that relate to, characterize or are otherwise associated with the corresponding problem pattern. Further, the patterns 130 may also correspond to state machines or other logical representations that characterize problems.

The service system 120 interacts with the service agent 118 in an iterative process to perform problem resolution. For example, the service agent 118 may request problem resolution assistance from the service system 120. Upon receiving the request, the service system 120 identifies candidate patterns from the available patterns 130. As noted above, each candidate pattern has at least one element that characterizes a problem associated with the corresponding pattern. An iterative process is then repeated between the service agent 118 and the service system 120 until a stopping criterion is met. The iterative process attempts to narrow the field of candidate patterns down until one or more possible root causes of the problem experienced by the service requestor 118 are identified. Alternatively, it may be determined that a possible root cause of the problem is not contained in the candidate patterns or some other action, event, etc., may interrupt the iterative process.

In response to each iteration, the service agent 118 parses available data to determine whether information, e.g., in collected event logs, configuration files and other sources of information 116, satisfies a next one of the elements for each of the candidate patterns. Based upon the query results returned to the services system 120, the number of candidate patterns may be adjusted, e.g., by removing each pattern as a candidate pattern if its associated problem is resolved by information considered by the service requestor. The service system 120 then makes one or more decisions based upon the results to the queries returned by the service agent 118 as will be described in greater detail herein.

In one exemplary implementation, a handshake mechanism is implemented between the service agent 118 and the service system 120. After receiving an initial request from the service agent 118 to assist with a problem determination, the service system 120 uses information about its patterns 130 to initiate a series of queries, where each query is directed towards determining whether the information 116 can satisfy a select element of one or more of the patterns 130. Thus, in response to receiving the queries, the service agent 118 automatically parses information 116 down into one or more decision trees 132 (or performs other suitable processing) that backs the iterative process between the service agent 118 and the service system 120, by determining whether any of the queried elements are satisfied by the available information 116. For example, this may comprise searching the log files, configuration files, and other sources of information 116 to perform pattern matching to a corresponding element, or by using other processing techniques to extract relevant information from the information 116.

Figure 3:
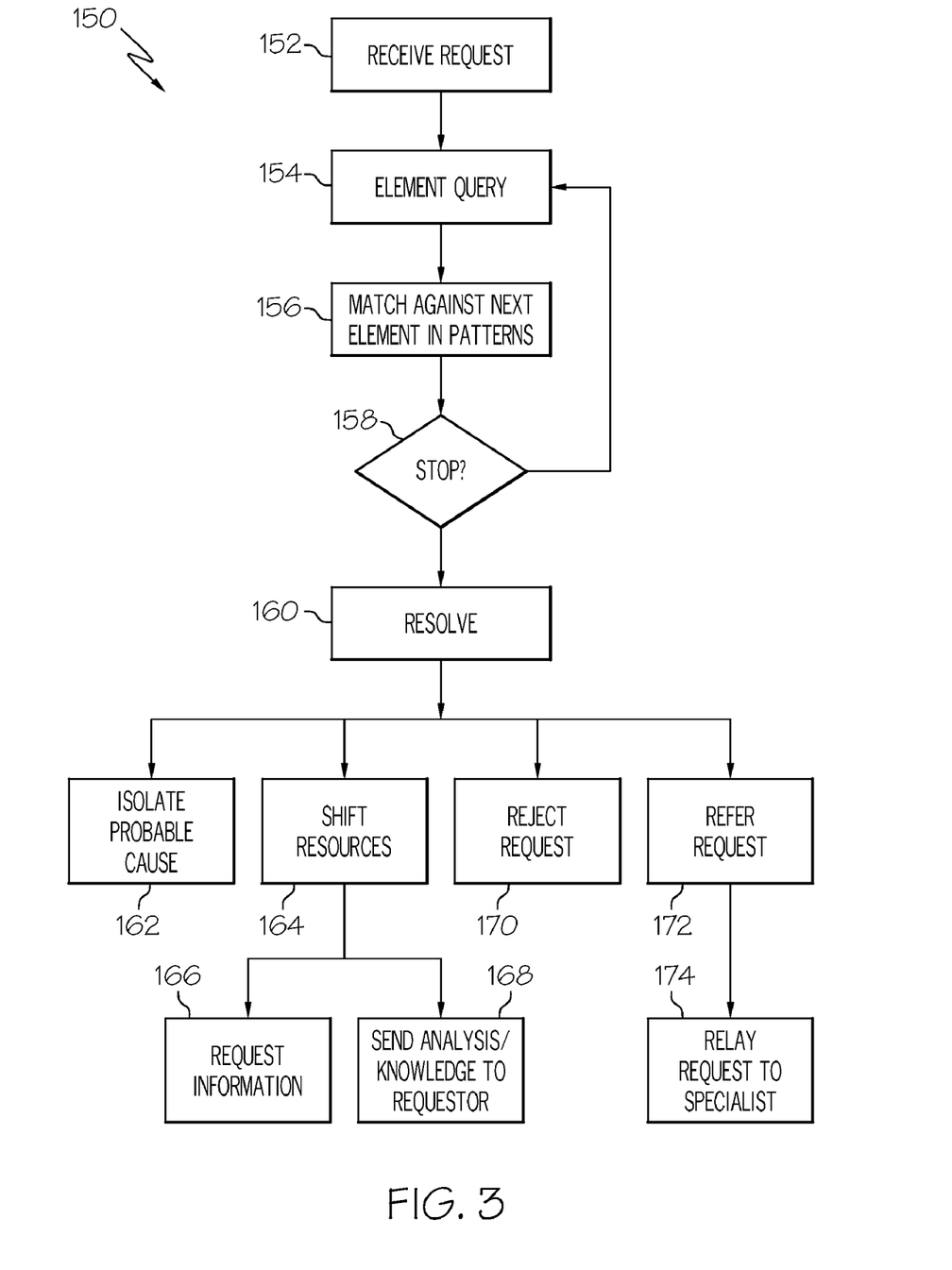
FIG. 3 is a flow diagram of an exemplary process for problem determination.

Referring to FIG. 3, an exemplary approach 150 is illustrated for performing problem determination. A request is received at 152 for assistance and problem determination. For example, the service agent 118 or other service requester may contact the analyzer server 108 for assistance to solve a problem. The analyzer server 108 responds by initiating a query back to the service requester to request pattern matching information at 154.

The process of querying the service requester at 154 may be an iterative process utilized to perform problem diagnosis. For example, the service system 120 may identify a plurality of patterns 130 as candidate patterns. The candidate patterns may comprise all of the patterns 130 or a subset of the patterns 130 stored in the knowledge base 122. For example, the service system 120 may have no initial knowledge of the likely root cause of the problem and/or no knowledge of the corresponding enterprise computer system 102 that is requesting the problem determination assistance. Under this arrangement, the service system 120 may initially identify all patterns 130 as candidate patterns.

As an alternative, a subset of the patterns 130 may be utilized as candidate patterns, such as where the service system 120 has some knowledge about the enterprise computing system 102 that allows the analyzer server 108 to reduce the total number of available patterns 130 to be considered as candidate patterns. For example, a systems analyst may have a hunch, at least at a high level, as to the cause of a problem. As such, the analyzer server 108 may have at least a general idea of the problem before beginning the problem determination service. As a further example, the analyzer server 108 may possess specific knowledge of the types of processing devices 102 employed by the enterprise computing system 102 or that are otherwise supported by the knowledge base 122 of the analyzer server 108. There may also be a service agreement or other arrangement between a solution provider and the operators of the enterprise computing system 102 such that the analyzer server 108 provides only a limited scope of problem determination to the enterprise computing system 102.

Any number of other factors, including bandwidth constraints and other network limitations, information regarding the business relationship between the entity implementing the service requester and the entity possessing the domain knowledge stored in the knowledge base of the analyzer server 108, initial guesswork at the root cause of an underlying problem, a history of solutions previously provided to the service requester, and other factors may also be considered when selecting a subset of patterns 130 as candidate patterns.

A query module, control module or other component of the service system sends a query to the service requester at 154, e.g., by identifying an element from each candidate pattern or otherwise identifying information that must be identified, e.g., in the information of the service requester to satisfy a corresponding candidate pattern element. A pattern matching module or other component of the service system 120 identifies ones of the candidate patterns at 156, having its select element matched to a corresponding event or other information, e.g., based upon query results returned by the service requestor.

The number of candidate patterns may then be adjusted, e.g., narrowed or otherwise modified. For example, a module may remove each pattern as a candidate pattern if the problem associated with that pattern is resolved by the received information. Thus, if a pattern is ruled out as a possible problem, or where a corresponding pattern is qualified as a possible problem pattern based upon the query results, then there is no need to continue to examine each of the elements. This may hold true regardless of whether all of the elements corresponding to that pattern have been queried. Similarly, a positive identification of a specific element may rule out a problem and its corresponding candidate pattern as a possible cause of the problem.

As a further example, a module may adjust patterns identified as candidate patterns to the ones of the candidate patterns having its select element matched to a corresponding event or other information monitored by the service requestor. The above process at 154 and 156 repeats in an iterative process until at least one stopping criterion is met at 158.

After recognizing the stopping criterion at 158, a resolution to the initial request is implemented at 160. The stopping criterion at 158 may comprise a determination of a possible root cause and a corresponding solution to the problem. A stopping criterion may also comprise a determination that there is no more pattern element data to query. Another exemplary stopping criterion may comprise a timeout or other operation that prematurely terminates the iterative process. Still further, a stopping criterion may be designated where returned query results identifies that no queried elements are satisfied by information in the log files 116. Other additional factors may also serve as suitable stopping criterion as the particular application dictates.

The resolution at 160 may comprise for example, the isolation of a probable root cause (or possible causes) at 162. Under this arrangement, knowledge is provided to the service requester as to the probable cause(s), solutions and/or other knowledge relevant to the identified probable root cause(s). Alternatively, if the root cause cannot be determined, the service system 120 may shift resources at 164. For example, the service system 120 may request that the logs and/or other types of information 116 be transmitted to the analyzer server at 166. For example, the service requestor may not have adequate resources to review the log data or to adequately process the received queries.

As another alternative, the service system 120 and the knowledge base 122 (or a portion of the knowledge base 122) may be transferred to the enterprise computer system at 168. Such may be necessary, for example, where a resolution cannot be determined using the iterative method described more fully herein, and there is too much data in the log files and other information to send to the analyzer server 108. There may be issues of security and trust associated with transporting the analysis engine 120 and the knowledge base 122 to the location of the incident, e.g., the enterprise computing system 102, which may require resolution before implementing the strategy at 168, and which may affect the viability or the particular implementation of the strategy at 168. The service system 120 may also deny the request for problem assistance at 170, or the service system 120 may refer the request at 172, such as by referring the request to a data analyst or other specialist at 174.

Figure 4:
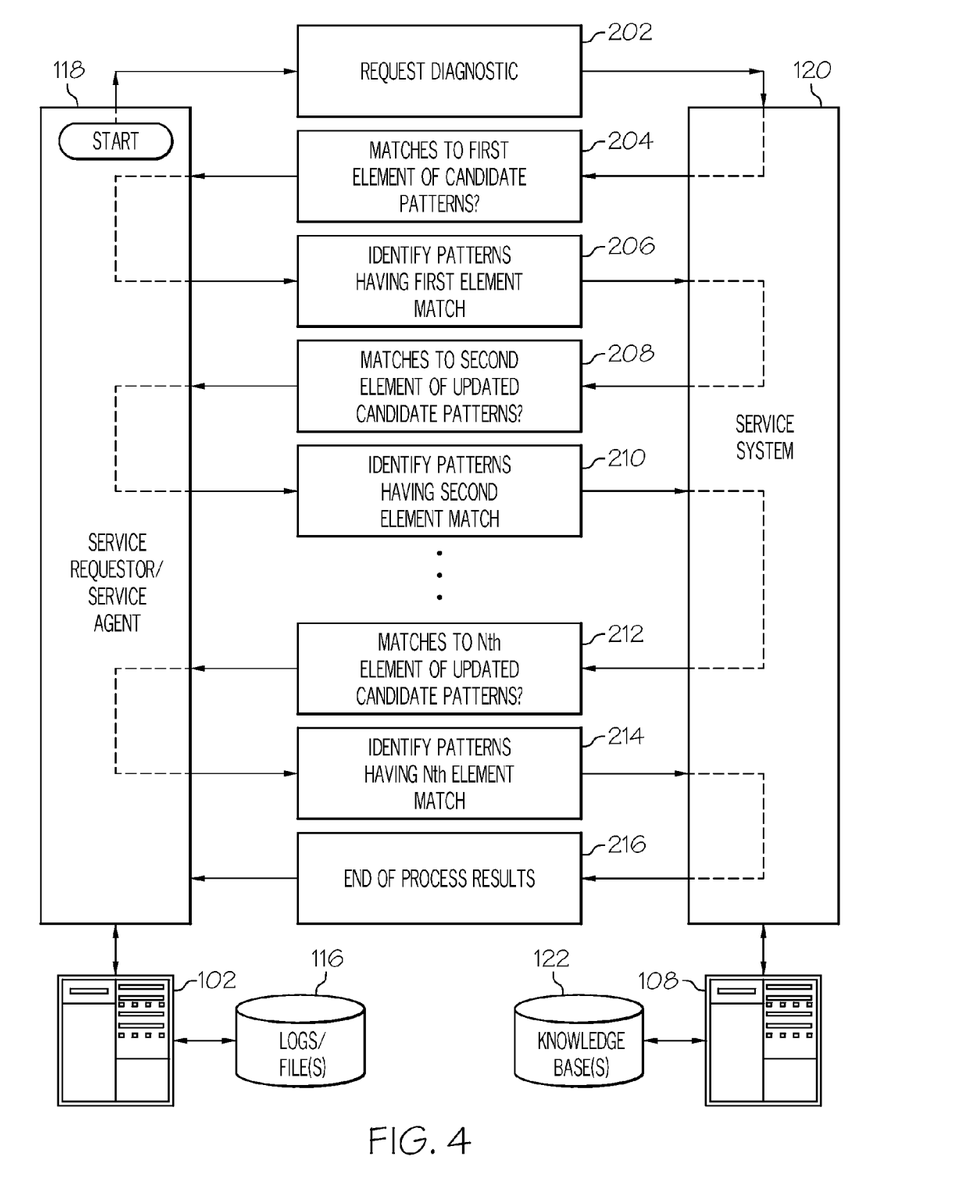
FIG. 4 is an exemplary flow interaction between a service requester and an analyzer server.

Referring to FIG. 4, a flow diagram illustrates an exemplary iterative process for querying the service agent 118 for problem determination. A diagnostic is requested at 202 from a service requester such as the service agent 118. The service system 120 responds to the service request by identifying candidate patterns and by initiating a first query back to the service agent 118 as described more fully herein. The first query comprises a request to the service agent 118 to identify whether or not matches can be associated to the first element of each candidate pattern. The service agent 118 responds to the first query at 206 by providing sufficient information to allow the service system 120 to identify candidate patterns having their first element matched to problem data in the corresponding log files and other information 116 monitored by the service agent 118. For example, the service agent 118 may return specific event listings or otherwise uniquely identify each element for which a match was found or where the associated element was otherwise satisfied.

If a candidate pattern has an element that was satisfied, the system server queries the service agent 118 with the next element in that candidate pattern. This process iteratively repeats until a stopping criterion is met. Thus, in response to the first query results, the service system 120 may alter the designation of candidate patterns. For example, if the first element of a select candidate pattern was not matched to corresponding data in the log files 116, it may be determined that the select candidate pattern does not correspond to a root cause of the problem associated with the enterprise computer system 102. As such, that select pattern may be eliminated as a possible candidate pattern.

Alternatively, sufficient information regarding a particular candidate pattern may be matched such that no further inquiry is necessary. For example, a select candidate pattern may be associated with a problem where the root cause can be identified by satisfying X symptoms out of a possible Y symptoms where X<Y. Under this arrangement, if appropriate elements have been matched, there may be enough evidence to associate the pattern to a possible root cause of a problem.

Still further, there may be conditions where a pattern is maintained as a candidate pattern even where a match was not returned, such as where a list of symptom elements is optional or where less than the totality of known symptoms is necessary to diagnose a possible root cause of a problem. Moreover, even if a match to a corresponding element is found in the log files and other information 116, it may be verified, validated or otherwise conditionally accepted based upon rules, conditions, associations to other elements, and other factors. For example, the service agent 118 may appear to match an element of interest to data in a log file, but the matching data may appear in a wrong one of the log files, the matching data may be associated with the wrong event source 112, the matching data may not have occurred within a predetermined time range of interest, the matching data may have been preceded or proceeded by another element that invalidates or otherwise disqualifies the match etc.

After processing the first query results, a second query is sent back to the service agent at 208 comprising a request to the service agent to identify whether or not matches can be associated with the second element of each remaining candidate pattern. The service agent 118 responds to the second query at 210 by providing sufficient information to allow the service system 120 to identify remaining candidate patterns having their second element matched to problem data in the corresponding log files 116 monitored by the service agent 118 as set out in greater detail herein. The above process of initiating a query, receiving results to the query and then updating the identified candidate patterns is iteratively implemented until a predetermined stopping criterion is met. For example, the service system 120 may send a query to the service agent corresponding to the Nth elements of the updated list of remaining candidate patterns at 212 where N corresponds to the last element in those candidate patterns. The service agent 118 responds at 214 providing sufficient information to allow the service system 120 to identify the remaining candidate patterns having their Nth element matched to problem data in the corresponding log files 116 monitored by the service agent 118.

The process then terminates at 216 and actions may be implemented in response to terminating the process at 216, e.g., as set out with regard to FIG. 3, at 162-174. Other or additional processes may also be implemented. For example, the service system 120 may select a new list of candidate patterns that were not previously considered, and repeat the process identified in FIG. 4.

Figure 5:
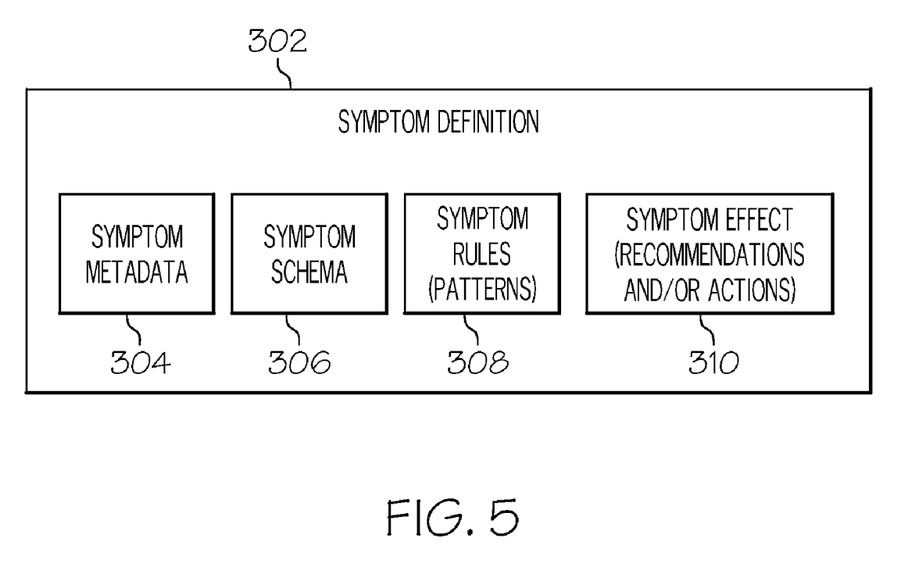
FIG. 5 is a block diagram of an exemplary symptom definition.

Referring to FIG. 5, an exemplary way to organize problem information is to describe the patterns in the knowledge base 122 in terms of symptom definitions 302. In general, symptoms correspond to collected or correlated information, e.g., events or collections of events and their associated root cause. Each symptom definition 302 may include explanations, samples and solutions that identify an action or actions to be performed in order to resolve the underlying problem(s). A symptom is thus a form of knowledge that indicates a possible problem or other situation of interest and may be used as a predefined problem definition. An exemplary problem signature may be modeled under the autonomic computing symptom specification by International Business Machines (IBM). For example, as shown, the symptom signature or definition may comprise symptom metadata 304, a symptom schema 306, symptom rules that correspond to the above-described patterns and a symptom effect, such as recommendations and/or actions. A plurality of symptom definitions may be established to characterize the problem patterns comprehended in the knowledge base 122.

The symptom metadata may comprise identification information, annotations, versioning location information etc. The symptom schema may include a description of the symptom including the kinds of problems or situations associated with the symptom when a symptom occurrence is recognized. The symptom schema may also include examples of problems or situations where the symptom is likely to occur, solutions to the problem or situation, which also may be described by an example attribute. The symptom schema may also include one or more references to additional information about the symptom, probabilities or certainties associated with the problem or situation indicated by the symptom occurrence, and/or priority information that denotes the priority of a given symptom in relation to other symptom occurrences within the same or similar scope.

Each symptom may be recorded with at least one event correlation rule, each correlation rule having at least one predicate thereof that can be corresponded to events 114 recorded in the log files and other information 116. For example, within a system, if error X occurs to component Y, then product Z may crash, fail, terminate, etc. However, the problem associated with product Z may be detected by recognizing that symptoms A, B and C are simultaneously present and correspond to the error X in component Y. As such, a solution can be identified, and/or a problem may be prevented, mitigated, compensated for or otherwise corrected if the problem and knowledge of a solution can be brought to the attention of the service requestor. As such, the symptoms that correspond to the patterns 130 may not only describe problems but further may be used to encode rules and/or provide an action to achieve solutions that stem from or relate to the current "symptom" or pattern that corresponds with a root cause problem.

Moreover, the probability of the occurrence of symptom A may be predicted by identifying the occurrence of any one or more of the predicate events D, E and F. Accordingly, the occurrence of a problem associated with product Z can be predicted before symptom A fully materializes, e.g., by determining that one or more of the predicates has been satisfied, such as by querying the service requestor for elements corresponding to events D, E and F.

Accordingly, the various aspects of the present invention are not limited to exact pattern matching of events. Rather, the system server 120 may be able to make probable cause determinations based upon incomplete pattern matching determinations. That is, the analyzer server 108 provides the necessary processing, e.g., via the system server 120, to combine particular events and their associated symptoms, e.g., using a suitable correlation engine to determine potential probable causes of existing problems and predicted future problems. For example, the analyzer may iteratively perform a symptom analysis comprising correlating events collected by the service requestor via the returned query responses with symptoms extracted from the knowledge base 122, and by dynamically updating a prediction of the likelihood that ones of the extracted symptoms will occur. A correlation may be identified if a particular event satisfies at least one predicate of an event correlation rule of the select symptom. Also, the prediction of likelihood of a given symptom may be based at least partially upon the currently satisfied predicates of its associated event correlation rules.

As an example, a problem signature may be modeled in the knowledge base 122 as a pattern 130 comprising a symptom definition, which includes a combination of a symptom rule and symptom recommendations. The symptom rule may comprise, for example, a set of logical expressions that define the kind of log records that identify a symptom. The symptom recommendations indicate what a user should do upon detection of that symptom. The symptom rules may be defined by a suitable rules rendering mechanism such as regular expressions, specialized correlation languages, database-style queries such as SQL, and other mechanisms. By way of illustration and not by way of limitation, the symptom rule could be defined by XPath expressions that represent a set of events in terms of the CommonBaseEvent specification, e.g., as represented as:

/CommonBaseEvent[contains(@msg, "JDBC Driver 1.7.6.0")]

/CommonBaseEvent[contains(@msg, "SVR0790E")]

The above expressions indicate that a symptom will be detected if an analysis of the log files 116 indicates that an event matching the first expression is subsequently followed by an event matching the second expression. For example, through the iterative process of querying the service requester as described more fully herein, the above CommonBaseEvent elements may be matched to data in the log files 116. The analyzer server 108 thus responds to the service agent 118 with the symptom recommendation such as "your DB2 JDBC driver needs to be upgraded to version 1.9.0.0 to prevent servlet errors in the WebSphere Server". Here, the recommendation is integrated into the problem signature via the associated pattern.

In the above illustrative example, the analyzer server 108 may implement a problem determination service system 120 that exchanges messages with a local service agent deployed on the remote system, i.e., the service agent 118. The service system 120 parses its symptom rules, e.g., patterns 130, and creates a list of XPath expressions for the first element, e.g., event, of all candidate definition patterns and inquiries the service agent 118 as to whether any of the log files have those event entries. The service agent 118 may reply with a list of XPath expressions that have a positive match. The service system 120 generates a list with the next event for all of the symptom rules/patterns matched previously and inquiries the service agent whether any of the log files have those entries. As in the above illustrative example, the service agent 118 may be required to match only events, e.g., /CommonBaseEvent[contains(@msg, "SVR0790E")], that happened after a corresponding previously matched event, e.g., /CommonBaseEvent[contains(@msg, "JDBC Driver 1.7.6.0")]. Accordingly, the service agent 118 may be required to track pointers and/or otherwise retain information regarding previously identified matches to queries from the system service 120. The above process is repeated as set out in greater detail herein.

At the end of the process, the system administrator of the service requester will have a list of eventual problems in its system, along with recommendations corresponding to these eventual problems, assuming there were corresponding system definitions in the knowledge base. For example, for each complete symptom rule match (all XPath expressions were matched by an event), a symptom recommendation may be submitted to the remote system and made available to a system administrator, e.g., your DB2 JDBC driver needs to be upgraded to version 1.9.0.0 to prevent servlet errors in the WebSphere Server as in the above example. However, in supplying domain knowledge, neither the knowledge base 122 nor the log files will have to be transmitted over the network. Only small fractions of the symptom rules (each iteration may transmit less and less data) and eventual recommendations as the candidate patterns are selectively narrowed.

The end result may comprise less network bandwidth and no need to transmit information from the log files 116 or the knowledge base 122, which may be confidential information. For example, the system administrator of the service requester may learn about the symptom rules underlying the problems found in analysis, but will not have full access to all of the other symptom definitions.

As another example, assume that a website can not connect to a database. Multiple web browsers that access the website may cause the propagation of error messages written to the log files 116. Thus, one error may trigger multiple log file entries on multiple machines. Ideally, the service agent 118 will be able to search the entire log files 116 associated with the enterprise computing system 102. However, it is not necessary that all of the log files 116 be available to the service agent 118. Moreover, there may be thousands of log entries between specific log entries of interest stored in the various log files 116, e.g., between an event indicating an error writing to the database and an event indicating an error connecting from a host web page to a corresponding database server that stores the database associated with the write error. A solution to a root cause of a problem may be based upon a recognition of those separated events and/or other factors. For example, a timestamp or other metadata associated with the events may be utilized to determine whether or not an event matches to a pattern element queried by the service system 120.

In an exemplary implementation, a "symptom definition" may be organized into a "symptom rule" and "symptom recommendation" pair. A "symptom rule" is or otherwise comprises the "pattern", such as pattern 130. As an example, a pattern (or symptom rule) could be "an event containing the message identifier MSG09871 is followed by an event containing the message identifier MSG6700 within 30 seconds"; the symptom recommendation for situations where that pattern is detected is "restart server".

A symptom may thus be conceptualized as a standardized mechanism for expressing information about problem indications. This information may include, for example, metadata, schema information and rules. The rules are, or otherwise comprise the patterns. In other words, patterns, as presented earlier, can be treated synonymously with symptom rules. Thus, symptoms contain the patterns, along with other associated information, e.g., as illustrated in FIG. 5. Moreover, symptoms may define recommendations and actions to be performed as well, as a response to the problem described by the other symptom elements.

The combination of the pattern (or symptom rule) and the recommendation are thus included in a corresponding symptom definition. Thus, if a problem matches the pattern (or symptom rule) contained in a corresponding symptom definition, it may be stated generally that the problem matches the symptom definition.

The concepts herein may also be generalized to support other specifications for a problem definition. In this regard, symptoms may be utilized, not only for diagnosing root causes of problems, but also for other enterprise driven activities, such as protection, optimization and configuration.

Figure 6:
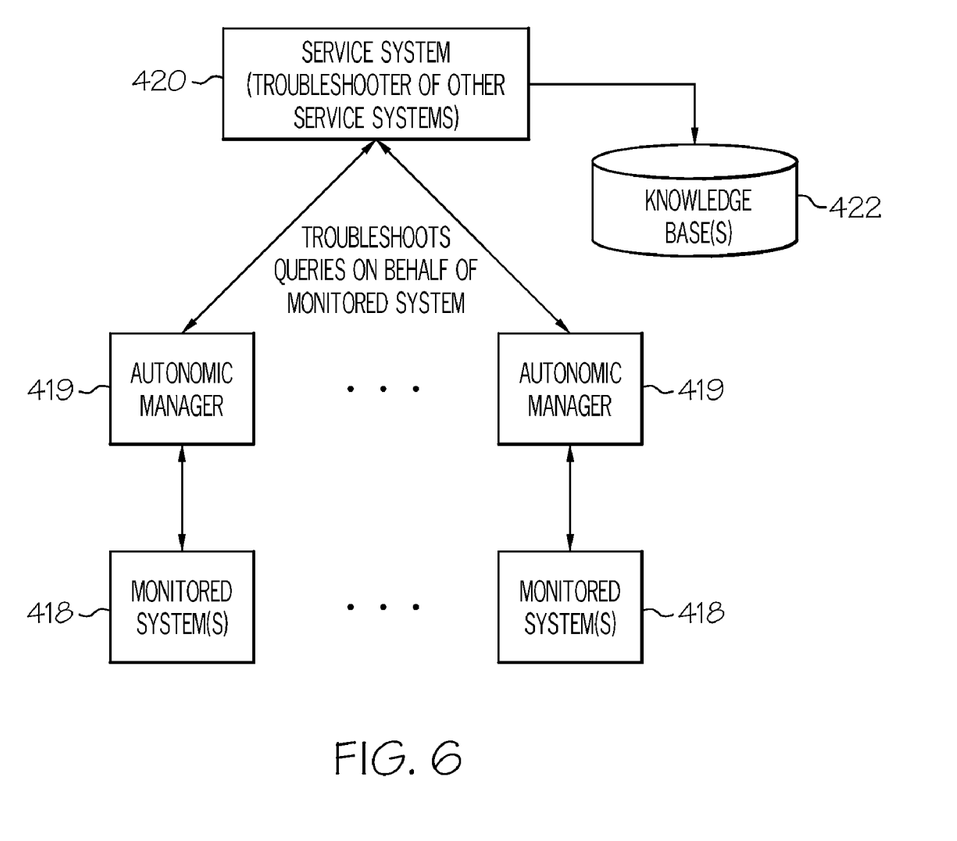
FIG. 6 is a block diagram of a system comprising autonomic managers that may be used for problem determinations of enterprise driven activities.

For example, referring to FIG. 6, the concepts described herein may also be applied to autonomic managers connected in a hierarchy. A plurality of monitored systems 418 is associated with a corresponding autonomic manager 419. Each monitored system 418 may communicate collected information, e.g., events or other sources of information, to their associated autonomic manager 419 for problem determination. The autonomic managers 419 in turn, communicate with the service system 420 to troubleshoot on behalf of the corresponding monitored system 418. The service system 420 utilizes the problem knowledge in its knowledge base(s) 422 to attempt to solve the problem.

The interaction between an autonomic manager 419 and the corresponding service system 420 and knowledge base 422 is substantially as described in greater detail herein with reference to the service agent 118, service system 120 and knowledge base(s) 122, wherein the autonomic manager 419 acts as a proxy or agent on behalf of the corresponding monitored system 418. However, as shown in FIG. 6, the autonomic manager 419 further acts as an intermediary between the monitored system 418 and the service system 420. The above can be extended to any number of hierarchical layers. In this manner, for example, a higher-level autonomic manager can establish a subscription to a subordinate autonomic manager based on the analysis of its correlation patterns, thus avoiding unnecessary traffic and manual configuration.

Essentially, now the subordinate autonomic manager 419 is the service agent and the higher-level autonomic manger 420 is the service system that looks at the events or other suitable information from a corresponding subordinate autonomic manager 419 and uses symptom knowledge to determine what situations are occurring in the subordinate autonomic manager 419. The higher-level autonomic manager 420 further gets the associated recommendations so that it can take action on the subordinate autonomic manager 419.

Figure 7:
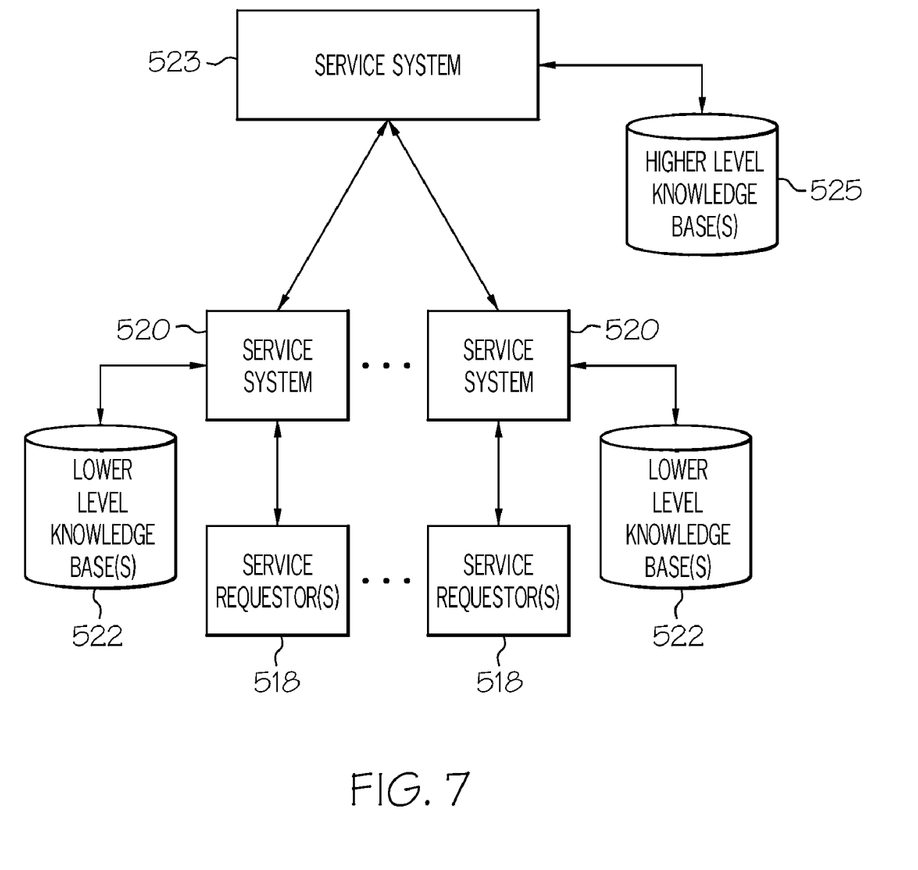
FIG. 7 is a block diagram of a system having multiple tiers of problem solving capability.

Referring to FIG. 7, in yet another exemplary implementation, a service requester 518 communicates a request for a problem determination to a corresponding service system 520. The service system 520 may have access to one or more knowledge base 522. In this exemplary arrangement, it may be assumed that the knowledge base(s) 522 may comprise lower level knowledge. The interaction between an service requester 518 and the corresponding service system 520 and knowledge base 522 is substantially as described in greater detail herein with reference to the service agent 118, service system 120 and knowledge base(s) 122. However, the service system 520 may have, for example, limited problem solving capabilities. As an example, the knowledge base 522 of a corresponding service system 520 may be limited to less valuable knowledge, a reasonably small number of problem solutions, e.g., the most commonly encountered problems of that service system 520, etc. This allows each service requester 520 to run relatively fast and/or handle a relatively large number of requests per unit of time.

If a given service requestor 520 cannot solve a problem of one of its associated service requesters 518, the problem can be forwarded up to a higher level service system 523. The higher level service system 523 has access to a relatively larger knowledge base 525. The knowledge base 525 may contain, for example, more valuable knowledge, more problem definitions, more detailed explanations to problem definitions, etc. As the knowledge base 525 contains relatively more data than the counterpart lower level knowledge base 522, it may be slower, e.g., because there are more candidates to run, etc. As another example, if the problem definitions in the knowledge base 525 contain relatively more data than the problem definitions in the corresponding knowledge base 522, then there may be additional processing cost when interacting with the higher level service system 523.

A service system 520 may interact with the service system 523, for example, in a manner analogous to that described above with reference to FIG. 6, wherein a given service system 520 acts as a proxy for its corresponding service requester 518 when communicating with the service system 523. Any number of layers and levels of hierarchy may be implemented in this regard. Moreover, the service systems 520 can use the interaction with the service system 523 to dynamically update their corresponding knowledge base 522 to keep track of the most common, relevant problem definitions.

Referring back to FIG. 3, there is recursive nature that may be tied to block 172, in which a service system can contact another service system (e.g., a higher-level autonomic manager) to escalate the problem resolution. This arrangement is useful to allow an arbitrary partition of the knowledge base across multiple service systems. As an example, the owner of a knowledge base may give away a part of its knowledge base and a license of the service system to a customer as part of a service agreement. The service system at the customer would be the first point of contact for the service agent. If the problem resolution reaches the block 172 on FIG. 3 and needs to refer a particular problem determination request, the service system at the customer site escalates the problem to the service system at the vendor location where the entire knowledge base is available, e.g., as illustrated in the exemplary arrangement of FIG. 7.

In this example, the subordinate autonomic manager may also assume the role of a processing device 104 that, itself produces events 114 in a manner similar to that previously described for other processing devices with reference to FIG. 1. For example, the subordinate autonomic manager may produce events that indicate situations about the security, configuration or workload of the systems that this autonomic manager manages. The higher-level autonomic manager then makes use of the Service System 120 as described previously to detect symptoms and associated recommendations to address the security, configuration or optimization situations being experienced by the subordinate autonomic manager.

The present invention is described below with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system modules or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions, or corresponding hardware for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of controlling the distribution of resolution knowledge comprising:

receiving by a service system of an analyzer server, a request for resolution knowledge from a service requestor executing on a remote server, wherein said request is communicated across a computer network;

identifying by said service system of said analyzer server a plurality of patterns as candidate patterns, each candidate pattern having at least one element that characterize a corresponding problem;

repeating until at least one stopping criterion is met:

providing information across said computer network by said analyzer server, to said service requestor that identifies at least one select element of the plurality of patterns;

receiving information by said service system of said analyzer server from said service requestor that enables identification of ones of said plurality of patterns having its element matched to corresponding received information from said service requestor; and removing each pattern from the ones of said plurality of patterns as a candidate pattern if the problem associated with that pattern is resolved by said received information;

determining resolution knowledge by said service system of said analyzer server after detecting that said at least one stopping criterion has been met; and communicating the determined resolution knowledge from said service system of said analyzer server to said service requestor.

2. The method according to claim 1, wherein said at least one stopping criterion comprises matching at least one of the plurality of patterns thus isolating a corresponding probable cause of a problem, wherein:

said determining resolution knowledge by said service system of said analyzer server after detecting that said at least one stopping criterion has been met comprises informing said service requestor of said probable cause and associated recommendations to address said probable cause.

3. The method according to claim 1, wherein said at least one stopping criterion comprises determining that none of the plurality of patterns have all of their elements matched to corresponding received information, wherein:

said determining resolution knowledge upon detecting that said at least one stopping criterion has been met comprises at least one of:

rejecting said request;

referring said request to another entity or service system; requesting information from said service requestor; or communicating a knowledge base and analysis engine to said service requestor.

4. The method according to claim 1, wherein said removing each pattern as a candidate pattern if the problem associated with that pattern is resolved by said received information comprises adjusting patterns identified as said candidate patterns to said ones of said candidate patterns having its element matched to corresponding received information.

5. The method according to claim 1, wherein
receiving information by said service system of said analyzer server from said service requestor that enables identification of ones of said plurality of patterns having its element matched to corresponding received information from said service requestor comprises issuing at least one query to said service requestor to obtain event information; and
said removing each pattern from the ones of said plurality of patterns as a candidate pattern if the problem associated with that pattern is resolved by said received information comprises removing a pattern as a candidate pattern if its corresponding problem is ruled out as a possible problem based upon the response to the at least one query.

6. The method according to claim 4, further comprising associating each pattern with a symptom definition, said symptom definition having at least one symptom recommendation.

7. The method according to claim 1, further comprising:
parsing pattern rules and creating a list of elements determined from parsing said pattern rules, where said list of elements correspond to said identified at least one select element of the plurality of patterns,
wherein:
said providing information to said service requestor that identifies at least one select element of the plurality of patterns comprises:
querying said service requestor as to whether any information accessible to said service requestor corresponds to any element on said list of elements;
said removing each pattern as a candidate pattern if the problem associated with that pattern is resolved by said received information comprises generating a list with next elements for all matched pattern rules based upon a received response to said query; and
said determining resolution knowledge upon detecting that said at least one stopping criterion has been met comprises submitting to said service requestor, a recommendation for each completely matched pattern rule of an associated candidate.

8. The method according to claim 1, wherein said plurality of patterns comprise correlation patterns and said service system comprises an autonomic manager within a plurality of autonomic managers that are connected in a hierarchy.

9. A system to control the distribution of resolution knowledge comprising:
an analyzer server that communicates with a service requestor executing on a remote server across a computer network, said analyzer server having:
a data storage defining a knowledge base that stores a plurality of patterns, each pattern defined by one or more elements that characterize a corresponding problem; and
a service system comprising:
a module that receives a request for resolution knowledge from a service requestor;
a module that identifies a plurality of patterns as candidate patterns from said plurality of patterns stored in said knowledge base,
a module that controls an iterative process until at least one stopping criterion is met comprising:
a module that provides information to said service requestor that identifies at least one select element of said plurality of patterns;
a module that receives information from said service requestor that enables identification of ones of said plurality of patterns having its element matched to corresponding received information from said service requestor; and
a module that removes each pattern from the ones of said plurality of patterns as a candidate pattern if the problem associated with that pattern is resolved by said received information; and
a module to determine resolution knowledge after detecting that said at least one stopping criterion has been met and communicates the determined resolution knowledge from said analyzer server to said service requestor.

10. The system according to claim 9, wherein said at least one stopping criterion comprises a match of at least one of the plurality of patterns thus isolating a corresponding probable cause of a problem, wherein:
said module to determine resolution knowledge after detecting that said at least one stopping criterion has been met informs said service requestor of said probable cause and associated recommendations to address said probable cause.

11. The system according to claim 9, wherein said at least one stopping criterion comprises determining that none of the plurality of patterns have all their elements matched to corresponding received information, wherein:
said module to determine resolution knowledge after detecting that said at least one stopping criterion has been met rejects said request, refers said request to another entity or service system, requests information from said service requestor, or communicates a knowledge base and analysis engine to said service requestor.

12. The system according to claim 9, wherein said module to remove each pattern as a candidate pattern if the problem associated with that pattern is resolved by said received information adjusts patterns identified as said candidate patterns to said ones of said candidate patterns having its select element matched to corresponding received information.

13. The system according to claim 9, wherein
said module that receives information from said service requestor that enables identification of ones of said plurality of patterns having its element matched to corresponding received information from said service requestor comprises issuing at least one query to said service requestor to obtain event information; and
said module that removes each pattern from the ones of said plurality of patterns as a candidate pattern if the problem associated with that pattern is resolved by said received information comprises removing a pattern as a candidate pattern if its corresponding problem is ruled out as a possible problem based upon the response to the at least one query.

14. The system according to claim 12, wherein each pattern is associated with a symptom definition, said symptom definition having at least one symptom recommendation.

15. The system according to claim 9, further comprising:
a module to parse pattern rules and create a list of elements determined from parsing said pattern rules, where said list of elements correspond to said identified at least one select element of the plurality of patterns, wherein:

said module that provides information to said service requestor that identifies at least one select element of the plurality of patterns comprises:

a module to query said service requestor as to whether any information accessible to said service requestor corresponds to any element on said list of elements;

said module that removes each pattern as a candidate pattern if the problem associated with that pattern is resolved by said received information comprises generating a list with next elements for all matched pattern rules based upon a received response to said query; and said module to determine resolution knowledge upon detecting that said at least one stopping criterion has been met comprises submitting to said service requestor, a recommendation for each completely matched pattern rule of an associated candidate.

16. The system according to claim 9, wherein said plurality of patterns comprise correlation patterns and said service system comprises an autonomic manager within a plurality of autonomic managers that are connected in a hierarchy.

17. A computer program product to control the distribution of resolution knowledge between entities comprising:

a computer usable medium having computer usable program code embodied therewith, the computer usable program code comprising:

computer usable program code configured to receive by a service system of an analyzer server, a request from a service requestor for resolution knowledge from a service requestor executing on a remote server, wherein said request is communicated across a computer network, computer usable program code configured to identify by said service system of said analyzer server, a plurality of patterns as candidate patterns, each candidate pattern having at least one element that characterizes a corresponding problem;

computer usable program code configured to control an iterative process until at least one stopping criterion is met comprising:

computer usable program code configured to provide information across said computer network by said analyzer server, to said service requestor that identifies at least one select element of the plurality of patterns;

computer usable program code configured to receive information by said service system of said analyzer server from said service requestor that enables identification of ones of said plurality of patterns having its element matched to corresponding received information from said service requestor; and computer usable program code configured to remove each pattern from the ones of said plurality of patterns as a candidate pattern if the problem associated with that pattern is resolved by said received information;

computer usable program code configured to determine resolution knowledge by said service system of said analyzer server after detecting that said at least one stopping criterion has been met; and computer usable program code configured to communicate the determined resolution knowledge from said service system of said analyzer server to said service requestor.

18. The computer program product according to claim 17, wherein said at least one stopping criterion comprises matching at least one of the plurality of patterns thus isolating a corresponding probable cause of a problem, wherein:

said computer usable program code configured to determine resolution knowledge by said service system of said analyzer server upon detecting that said at least one stopping criterion has been met comprises computer usable program code configured to inform said service requestor of said probable cause and associated recommendations to address said probable cause.

19. The computer program product according to claim 17, wherein said at least one stopping criterion comprises determining that none of the plurality of patterns have all of their elements matched to corresponding received information, wherein:

said computer usable program code configured to said determine resolution knowledge upon detecting that said at least one stopping criterion has been met comprises at least one of:

computer usable program code configured to reject said request;

computer usable program code configured to refer said request to another entity or service system;

computer usable program code configured to request information from said service requestor; or computer usable program code configured to communicate a knowledge base and analysis engine to said service requestor.

20. The computer program product according to claim 17, wherein said computer usable program code configured to remove each pattern as a candidate pattern if the problem associated with that pattern is resolved by said received information adjusts patterns identified as said candidate patterns to said ones of said candidate patterns having its element matched to corresponding received information.

21. The computer program product according to claim 17, wherein computer usable program code configured to receive information by said service system of said analyzer server from said service requestor that enables identification of ones of said plurality of patterns having its element matched to corresponding received information from said service requestor comprises computer usable program code configured to issue at least one query to said service requestor to obtain event information; and said computer usable program code configured to remove each pattern from the ones of said plurality of patterns as a candidate pattern if the problem associated with that pattern is resolved by said received information comprises computer removes a pattern as a candidate pattern if its corresponding problem is ruled out as a possible problem based upon the response to the at least one query.

22. The computer program product according to claim 20, wherein each pattern is associated with a symptom definition, said symptom definition having at least one symptom recommendation.

23. The computer program product according to claim 17, further comprising:

computer usable program code configured to parse pattern rules and create a list of elements determined from parsing said pattern rules, where said list of elements correspond to said identified at least one select element of the plurality of patterns, said computer usable program code configured to provide information to said service requestor that identifies at least one select element of the plurality of patterns comprises:

computer usable program code configured to query said service requestor as to whether any information accessible to said service requestor corresponds to any element on said list of elements;

said computer usable program code configured to remove each pattern as a candidate pattern if the problem associated with that pattern is resolved by said received information comprises generating a list with next elements for all matched pattern rules; and said computer usable program code configured to determine resolution knowledge upon detecting that said at least one stopping criterion has been met comprises submitting to said service requestor, a recommendation for each completely matched pattern rule of an associated candidate.

24. The computer program product according to claim 17, wherein said plurality of patterns comprise correlation patterns and said service system comprises an autonomic manager within a plurality of autonomic managers that are connected in a hierarchy.

* * * * *